(12) United States Patent
Krishnamurthy (10) Patent No.: US 9,633,375 B2
(45) Date of Patent: Apr. 25, 2017

(54) SYSTEM AND METHOD FOR RECOMMENDING ONLINE MULTIMEDIA CONTENT

(71) Applicant: Kishore Adekhandi Krishnamurthy, Bangalore (IN)

(72) Inventor: Kishore Adekhandi Krishnamurthy, Bangalore (IN)

(73) Assignee: SUREWAVES MEDIATECH PRIVATE LIMITED, Karnataka (IN)

( * ) Notice: Subject to any disclaimer, the term of this patent is extended or adjusted under 35 U.S.C. 154(b) by 106 days.

(21) Appl. No.: 13/762,899

(22) Filed: Feb. 8, 2013

(65) Prior Publication Data

US 2013/0212178 A1 Aug. 15, 2013

(30) Foreign Application Priority Data

Feb. 9, 2012 (IN) .............................. 496/CHE/2012

(51) Int. Cl.
*G06Q 30/02* (2012.01)
*H04L 29/08* (2006.01)

(52) U.S. Cl.
CPC ......... *G06Q 30/0269* (2013.01); *H04L 67/02* (2013.01)

(58) Field of Classification Search
CPC .................................................. G06Q 30/0269
USPC ....................................................... 709/204
See application file for complete search history.

(56) References Cited

U.S. PATENT DOCUMENTS

| 8,751,507 B2* | 6/2014 | Kim et al. .................... 707/748 |
| 2002/0056095 A1* | 5/2002 | Uehara ............. G06F 17/30793 725/38 |
| 2002/0062250 A1* | 5/2002 | Nagano .................. G06Q 30/02 705/14.25 |
| 2007/0192300 A1* | 8/2007 | Reuther et al. .................... 707/3 |
| 2007/0204301 A1* | 8/2007 | Benson .......................... 725/46 |
| 2008/0086456 A1* | 4/2008 | Rasanen et al. .................. 707/3 |
| 2008/0134043 A1* | 6/2008 | Georgis ............ G06F 17/30035 715/733 |
| 2008/0320510 A1* | 12/2008 | Wong .................. H04N 7/17318 725/24 |
| 2010/0064040 A1* | 3/2010 | Wise ...................... G06Q 30/02 709/224 |
| 2010/0153411 A1* | 6/2010 | Toebes .............. G06F 17/30867 707/758 |
| 2012/0021774 A1* | 1/2012 | Mehta ................ G06Q 30/0282 455/456.3 |
| 2012/0254917 A1* | 10/2012 | Burkitt et al. .................. 725/40 |

(Continued)

*Primary Examiner* — Jimmy H Tran
(74) *Attorney, Agent, or Firm* — Barry Choobin; Patent 360 LLC (57) ABSTRACT

A method of recommending and prioritizing multimedia content targeted to a user is provided. The method includes (i) obtaining a first set that includes one or more multimedia content based on a first set of parameters, (ii) obtaining a second set that includes one or more multimedia content based on a second set of parameters, (iii) computing (a) one or more priority indicators of the one or more multimedia content of the first set, and (b) one or more priority indicators of the one or more multimedia content of the second set, and (iv) prioritizing a subset of multimedia content targeted to the user based on at least one of (a) the one or more priority indicators of the one or more multimedia content of the first set, and (b) the one or more priority indicators of the one or more multimedia content of the second set.

6 Claims, 11 Drawing Sheets

(56) References Cited

U.S. PATENT DOCUMENTS

| | | | |
|---|---|---|---|
| 2012/0296920 A1* | 11/2012 | Sahni et al. | 707/749 |
| 2016/0027090 A1* | 1/2016 | Sofos | H04H 60/31 705/26.7 |
| 2016/0098640 A1* | 4/2016 | Su | G06N 5/04 706/50 |
| 2016/0192007 A1* | 6/2016 | Piepenbrink | G06F 17/30029 725/131 |

* cited by examiner

SYSTEM AND METHOD FOR RECOMMENDING ONLINE MULTIMEDIA CONTENT

CROSS-REFERENCE TO RELATED APPLICATIONS

This application claims priority to Indian patent application no. 496/CHE/2012 filed on Feb. 9, 2012, the complete disclosure of which, in its entirety, is herein incorporated by reference.

BACKGROUND

Technical Field

The embodiments herein generally relate to delivering of multimedia content and more particularly to a system and method for generating and recommending prioritized multimedia content targeted to a user.

Description of the Related Art

The World Wide Web (WWW) includes large volumes of multimedia content (e.g., millions of videos, text, pictures etc.) and these volumes are constantly growing. According to a finding, about sixty percent of the data consumed on the internet is online multimedia content. However, in this age of information overload, it may be difficult for a user to locate the multimedia content. Users may find the multimedia content that they are interested in, in a chance encounter or upon rigorously searching the web for the intended multimedia content.

Further, directory services, videos shared over social networking sites and the multimedia content that is forwarded by e-mail or embedded in a blog may help the user to find a multimedia content of interest. In most cases however, a user who is looking for entertainment may not have specific content, or keywords corresponding to specific content in mind. When the user is not clear about the specific content that he/she wants to consume, he is unlikely to be able to find content of interest of relevance, and thus leave the content provider's website. Thus, there is a loss of revenue to the website that hosts the multimedia content.

Existing methodologies for locating content are based on the user providing specific keywords, and matching them with metadata of the stored multimedia content. Since a user may not have specific content in mind in the first place, he/she is unlikely to locate content that is of interest or relevance. Also, the user would typically only find content that he/she is already aware of, and would thus be unlikely to discover any new content that would be potentially of interest. Accordingly, there remains a need to automatically discover and recommend multimedia content that is relevant and of interest to the user, without the user having to specifically provide input at each stage.

SUMMARY

In view of the foregoing, an embodiment herein provides a method of recommending and prioritizing multimedia content targeted to a user. The method includes (i) obtaining one or more multimedia content based on a first set of parameters, (ii) obtaining one or more multimedia content based on a second set of parameters, (iii) computing (a) one or more priority indicators for the one or more multimedia content of the first set, and (b) one or more priority indicators for the one or more multimedia content of the second set, and (iv) prioritizing a subset of multimedia content targeted to the user based on at least one of (a) the one or more priority indicators for the one or more multimedia content of the first set, and (b) the one or more priority indicators for the one or more multimedia content of the second set. The first set of parameters may include at least one of (i) a trending topics, (ii) a breaking news, (iii) a trending multimedia content, (iv) a celebrity, and (v) a popular channel. The second set of parameters may include at least one of (i) activities of at least one user connected to the user on at least one social medium (ii) a celebrity social channel, (iii) a preferred celebrity of the user, and (iv) a subscribed channel.

The one or more priority indicators of the one or more multimedia content of the first set may be computed based on at least one of (i) relative degree associated with a multimedia content, (ii) recency of activity associated with a multimedia content, (iii) trending of a multimedia content, and (iv) a popularity of at least one of (a) a multimedia content, (b) a celebrity, (c) a channel, or (d) a topic.

The one or more priority indicators of the one or more multimedia content of the second set may be computed based on at least one of (i) profile of the user, (ii) taste of the user, (iii) affinities of the user, (iv) preferences of the user, and (v) past activities of the user. The profile may include an age group, a gender, a qualification, hobbies and a location of the user. The method may further include (v) discarding an undesirable multimedia content from (a) the first set and (b) the second set, and (vi) discarding any duplicate multimedia content from (a) the first set, (b) the second set, and (c) a combination of the first set and the second set based on a metadata associated with each multimedia content of the first set and the second set. The metadata may be generated by an authentic source. The undesirable multimedia content may be flagged as (a) a dead link, (b) unreliable or objectionable, and (c) an explicit multimedia content.

In another embodiment, a content recommendation system is provided. The content recommendation system includes (i) a memory unit containing a database that stores at least one of (i) profile of a user, (ii) taste of the user, (iii) affinities of the user, (iv) preferences of the user, and (v) past activities of the user. The profile includes an age group, a gender, a qualification, hobbies and a location of the user. The content recommendation system further includes (ii) a processor that executes a set of modules including (a) a priority computing module executed by the processor that is configured to (i) compute one or more priority indicators for a first set, and compute one or more priority indicators for a second set. The first set includes one or more multimedia content that is obtained based on a first set of parameters. The second set includes one or more multimedia content that is obtained based on a second set of parameters. The set of modules further include (b) a multimedia content personalization module executed by the processor that is configured to prioritize a subset multimedia content targeted to the user based on (i) the one or more priority indicators of the first set, (ii) and the one or more priority indicators of the second set. A filtering module of the set of modules may be executed by the processor that may be configured to (a) filter an undesirable multimedia content from (a) the first set and (b) the second set, and (vi) filter duplicate multimedia content from (a) the first set, (b) the second set, and (c) a combination of the first set and the second set based on a metadata associated with each multimedia content of the first set and the second set. The metadata may be generated by an authentic source. The undesirable multimedia content may be flagged as (a) a dead link, (b) unreliable or objectionable, or (c) an explicit multimedia content.

The one or more priority indicators of the first set may be computed based on at least one of (i) relative degree associated with a multimedia content, (ii) recency of activity associated with a multimedia content, (iii) trending of a multimedia content, and (iv) a popularity of at least one of (a) a multimedia content, (b) a celebrity, (c) a channel, or (d) a topic. The one or more priority indicators of the second set may be computed based on at least one of (i) profile of the user, (ii) taste of the user, (iii) affinities of the user, (iv) preferences of the user, and (v) past activities of the user. The profile may include an age group, a gender, a qualification, hobbies and a location of the user.

In yet another embodiment, a non-transitory program storage device readable by a computer, and includes a program of instructions executable by the computer to perform a method of recommending and prioritizing multimedia content targeted to a user is provided. The method includes (i) obtaining a first set that includes one or more multimedia content based on a first set of parameters, (ii) obtaining a second set that includes one or more multimedia content based on a second set of parameters, (iii) discarding an undesirable multimedia content from the first set and the second set, (iv) computing one or more priority indicators for the one or more multimedia content of the first set based on at least one of (i) relative degree associated with a multimedia content, (ii) recency of activity associated with a multimedia content, (iii) trending of a multimedia content, and (iv) a popularity of at least one of (a) a multimedia content, (b) a celebrity, (c) a channel, or (d) a topic, (v) computing one or more priority indicators for the one or more multimedia content of the second set based on at least one of (i) profile of the user, (ii) taste of the user, (iii) affinities of the user, (iv) preferences of the user, and (v) past activities of the user, and (v) prioritizing a subset of multimedia content targeted to the user based on at least one of (a) the one or more priority indicators of the one or more multimedia content of the first set, and (b) the one or more priority indicators of the one or more multimedia content of the second set. The undesirable multimedia content is being flagged as (i) a dead link, (ii) unreliable or objectionable, or (iii) an explicit multimedia content. The profile includes an age group, a gender, a qualification, hobbies and a location of the user. The method may further include discarding a duplicate multimedia content from (a) the first set, (b) the second set, and (c) a combination of the first set and the second set based on a metadata associated with each multimedia content of the first set and the second set. The metadata may be generated by an authentic source. Each multimedia content of the subset of multimedia content may include one or more reasons for prioritizing and recommending the each multimedia content to the user. The one or more reasons may be obtained from at least one of (i) the first set of parameters, and (ii) the second set of parameters.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the principle thereof, and the embodiments herein include all such modifications.

BRIEF DESCRIPTION OF THE DRAWINGS

The embodiments herein will be better understood from the following detailed description with reference to the drawings, in which.

DETAILED DESCRIPTION OF PREFERRED EMBODIMENTS

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a method of generating and recommending a multimedia content targeted to a user periodically. The embodiments herein achieve this by providing a content recommendation system to generate and recommend a prioritized multimedia content targeted to the user based on one or more (i) a first set of parameters (ii) a second set of parameters. Referring now to the drawings, and more particularly to FIGS. 1 through 7, where similar reference characters denote corresponding features consistently throughout the figures, there are shown preferred embodiments.

Figure 1:
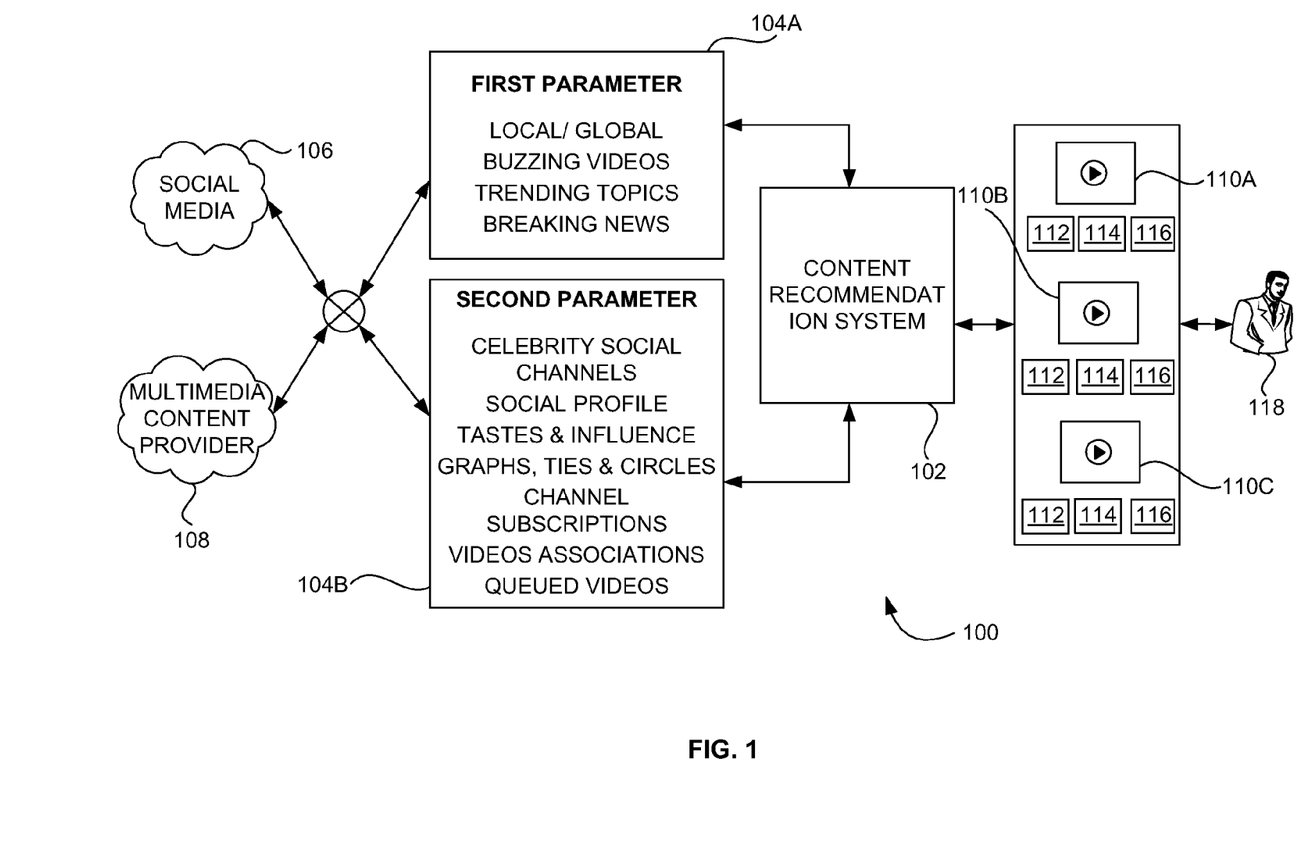
FIG. 1 illustrates a system view of a content recommendation system which generates and recommends a prioritized multimedia content targeted to a user according to an embodiment herein.

FIG. 1 illustrates a system view 100 of the content recommendation system 102 which generates and recommends the prioritized multimedia content 110A-C targeted to the user 116 according to an embodiment herein. The system 100 includes a content recommendation system 102, a first set of parameters 104A, a second set of parameters 104B, a social media 106, a multimedia content provider 108, a prioritized multimedia content 110A-C, a trending field 112, a celebrity sharing field 114, a friend sharing field 116, and a user 118. The content recommendation system 102 which generates and recommends the prioritized multimedia content 110A-C periodically (hourly, daily, weekly, monthly etc.) which is more relevant to the user 118. In one embodiment, the prioritized multimedia content 110A-C is recommended by filtering a one or more multimedia content based on one or more general parameters (e.g., a first set of parameters 104A, a second set of parameters 104B). In embodiment, the one or more general parameters (e.g., the first set of parameters 104A) may include one or more (i) a trending topics, (ii) news (e.g., a breaking news), (iii) local/global (iv) a trending multimedia content, (v) a celebrity, and (vi) a popular channel. In one embodiment, the one or more general parameters (e.g., the second set of parameters 104B) may include one or more (i) activities of at least one user connected to the user on at least one social medium (social networking sites (e.g., Facebook©, Twitter© etc.)), (ii) a celebrity social channel, (iii) a preferred celebrity of said user, and (iv) a subscribed channel.

In one embodiment the prioritized multimedia content 110A-C may be a video, text, pictures. The content recommendation system 102 which receives the one or more multimedia content (e.g., one or more videos) as an input from the social media 106 and the multimedia content provider 108. In one embodiment, the social media 106 may be social networking sites (e.g., Facebook©, Twitter© etc.). In one embodiment, authentic multimedia content sources may be TV channels (e.g. news (CNN-IBN, BBC etc.)). In another embodiment, the multimedia content provider 108 may be (e.g. YouTube™ etc). In one embodiment, the content recommendation system 102 communicates with the social media 106 and the multimedia content provider 108 through a network. In another embodiment, the network may be an internet, or a broadcast network. In one embodiment, the prioritized multimedia content 110A-C may be recommended to the user 118 (e.g., by using a display device such as a television, mobile communication device, a smart phone, a tablet PC, a laptop, a desktop, and an ultra book etc). The content recommendation system 102 obtain a set of multimedia content (e.g., a first set of multimedia content and a second set of multimedia content) based on one or more general parameters (e.g., the first set of parameters 104A and (ii) the second set of parameters 104B).

The content recommendation system 102 discards an undesirable multimedia content from the set of multimedia content. In one embodiment, the undesirable multimedia content is being flagged as (i) a dead link, (ii) unreliable or objectionable, or (iii) an explicit multimedia content. In one embodiment, the content recommendation system 102 discards a duplicate multimedia content from the set of multimedia content based on a metadata associated with each multimedia content of the first set and the second set. For example the metadata is generated by an authentic source.

In one embodiment, the content recommendation system 102 computes the one or more priority indicators (e.g., a weightage assigned) for the first set of multimedia content based on one or more (i) relative degree associated with a multimedia content, (e.g., trendiness, degree of being a hot news story), (ii) recency of activity (e.g., celebrity shared time, channel uploaded time, and buzzing time, etc.) associated with a multimedia content, (iii) trending of a multimedia content, and (iv) a popularity of one or more (a) a multimedia content, (b) a celebrity, (c) a channel, or (d) a topic. In another embodiment, the content recommendation system 102 computes the one or more priority indicators (e.g., a weightage assigned for the second set of multimedia content based on one or more (i) a user profile (e.g., an age group, a gender, a qualification, hobbies and a location of the user, (ii) a user taste, (iii) affinities of the user, (iv) preferences of the user, and (v) past activities of the user (e.g., indicators to browsing history or activity of the user 118, lists of previous content viewed by the user 118 and any other parameter that helps in increasing an accuracy of identifying the interest of the user 118 etc.). In one embodiment, the affinities of the user may include a) affinity between a user and friends within the content recommendation system and friends in other social networking sites (e.g., Facebook©, Twitter© etc.), b) affinity between the user and channels c) affinity between the user and celebrity d) affinity between user and one or more general parameters, etc.

In one embodiment, the content recommendation system 102 may personalize the first set of multimedia content and the second set of multimedia content to generate the prioritized multimedia content 110A-N targeted to the user 118. In one embodiment, the prioritized multimedia content 110A-N may be recommended to the user 118 based on the one or more general parameters (e.g., a trending field 112, a celebrity sharing field 114, a friend sharing field 116).

Figure 2:
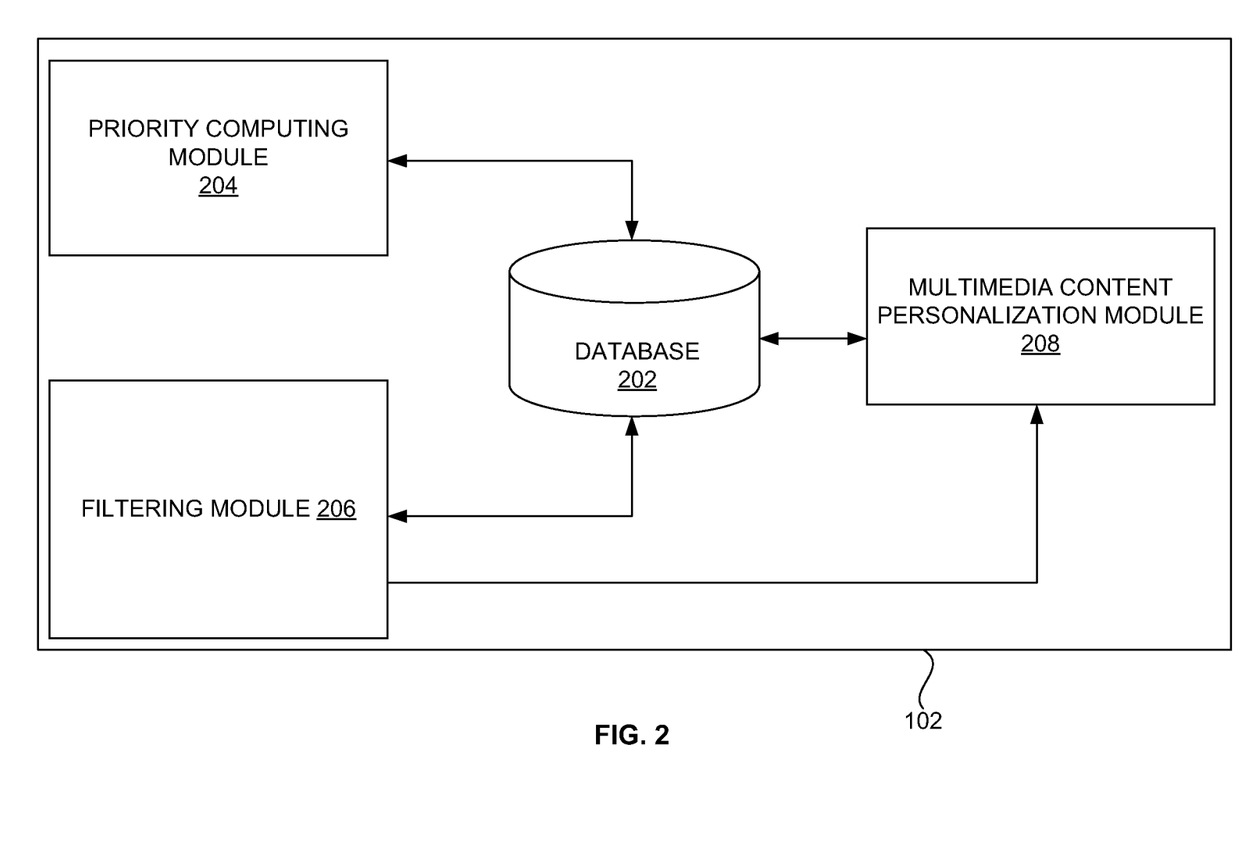
FIG. 2 illustrates an exploded view of the content recommendation system according to an embodiment herein.

FIG. 2 illustrates an exploded view of the content recommendation system 102 according to an embodiment herein. The exploded view 102 includes a database 202, a priority computing module 204, a filtering module 206, and a multimedia content personalization module 208. The database 202 stores multimedia content information. In one embodiment, the database 202 stores one or more (i) profile of a user (e.g., an age group, a gender, a qualification, hobbies and a location of the user), (ii) interest of the user, (iii) activities of the user, (iv) a social graph data, (v) demographics, and (vi) the prioritized multimedia content 110A-C. In one embodiment, the database may reside in remote location.

The content recommendation system 102 includes the priority computing module 204 computes the one or more priority indicators (e.g., a weightage assigned) for the first set of multimedia content. The priority computing module 204 computes the one or more priority indicators (e.g., a weightage assigned) for the second set of multimedia content. The content recommendation system 102 includes the filtering module 206 which filters the one or more multimedia content to generate the prioritized multimedia content 110A-C. In one embodiment, filtering of the one or more multimedia content include using the one or more general parameters to reduce a number of selections to arrive at generate the prioritized multimedia content 110A-C. In one embodiment, the one or more general parameters may include one or more attributes concerning activities such as viewing, sharing, commenting and including (e.g., an embedding).

In one embodiment, the filtering module 206 which filters the undesirable multimedia content from the set of multimedia content. In one embodiment, the undesirable multimedia content is being flagged as (i) a dead link, (ii) unreliable or objectionable, or (iii) an explicit multimedia content. In one embodiment, the content recommendation system 102 filters the duplicate multimedia content from the set of multimedia content based on a metadata associated with each multimedia content of the first set and the second set.

In one embodiment, the content recommendation system 102 provides a method of decoupling the process of filtering the one or more multimedia content based on a user generated metadata surrounding the one or more multimedia content. In another embodiment, the process of filtering the one or more multimedia content based on the metadata generated by an authentic source. The database 202 stores a list of authentic sources qualified for providing the one or more multimedia content. The one or more multimedia content tagged with a metadata posted by one or more authentic sources may be considered for filtering.

In one embodiment, the multimedia content for the first set of parameters 104A may be selected from the group consisting of a trending video (e.g., velocity of the number of video views), a trending topic, a buzzing topic, association to a breaking news topic, a local/global news, a popularity (total number of video views) associated to a popular topic. In one embodiment, the multimedia content for the second set of parameters 104B may be selected from the group consisting of association of the user with the person (friend, family, coworker, etc.) sharing the video, shared by a celebrity and/or influencer, link to a topic of user interest.

In one embodiment, the first set of parameters 104A may include a one or more attributes, such as geography. For example, the geography attribute may be categorized into local (city, state and country) and global. Hence, the step of filtering of the one or more video content using the one or more general parameters 'trending video' may result in a selection of two videos (trending video (local) and trending video (global)) under the attribute 'geography'.

The multimedia content personalization module 208 which generates the prioritized multimedia content 110A-C targeted to the user 118. For example, (i) an engineer may wish to see more of a technical content, (ii) a women may wish to view content relevant to home decoration, housekeeping and beauty care etc. In one embodiment, children belonging to certain age group may be shown content requesting parental guidance, (iii) a children below a predetermined age may be shown content requesting parental guidance. For example, children below a predetermined age may be barred from viewing the video content meant for adults etc.

In one embodiment, each of the one or more general parameters may be assigned with a weightage. For example, when a user is a male, videos concerning sports, automobile and gadgets may be given more weightage when compared to videos related to housekeeping and beauty care. Further, if the profile indicates the user 118 to be technically qualified, then videos related to gadgets may be given more weightage than videos related to a fashion etc.

In one embodiment, the prioritized multimedia content 110A-C may be selected based on the ranking such as top ten, top twenty etc. The multimedia content personalization module 208 may first check the prioritized multimedia content 110A-C to discard the instance of resending the video content that has previously been presented to the user 118. In another embodiment, selecting the one or more prioritized multimedia content 110A-C which has already been delivered to the user 118, adds an equal number of video contents having a ranking following the prioritized multimedia content 110A-C may be selected for delivery and presented to the user 118.

In another embodiment, a second check may be conducted on the prioritized multimedia content 110A-C to evaluate and confirm the current availability of each of the prioritized multimedia content 110A-C. For example, the second check may be configured to discard an undesirable multimedia content from the prioritized multimedia content 110A-C based on at least one of (i) the undesirable multimedia content being flagged as a dead link, (ii) the undesirable multimedia content being flagged as unreliable or objectionable, and (iii) the undesirable multimedia content being as explicit multimedia content (e.g., obscene words and/or profane language).

In one embodiment, the video content that is presented to the user 118 may include in addition to the prioritized multimedia content 110A-C, a promotional content (e.g., a sponsored and/or other commercial content etc). Further, the relevance of the promotional content presented to the user 118 may be enhanced by the selection of the promotional content based on one or more general parameters.

In one embodiment, presenting the selected video content includes delivering the prioritized multimedia content 110A-C, which are uploaded during a span of a user determined time period, and are estimated to be having highest relevance to the user 118. For example, the method of filtering the video content may be executed each time following an expiry of the user determined time period. Further considering only the video content that is uploaded during the span of user determined time period helps in avoiding repeated selection of a single video content. Hence, the method of filtering the video content results in the presentation of most relevant video content in a typical time period (e.g. month, week or a day).

In one embodiment, presentation of the prioritized multimedia content 110A-C includes one or more reasons for selecting each of the one or more multimedia content that may be presented to the user 118. The one or more reasons provides the user 118 with increased awareness to the context of the video content and facilitates making decision about the priority to be given in viewing the presented video content. For example, a user may be presented with the prioritized multimedia content 110A-C, each video content may be tagged with a reason for selection such as trending video (velocity of the number of video views), popularity (total number of video views), association to a popular topic, association to a trending topic, association of the user with the person (friend, family, coworker, etc) sharing the video, shared by a celebrity and/or influencer, association to a breaking news topic and link to a topic of user interest. Hence, with the help of the reasons provided along with the video content, the user 118 may be more at ease in selecting which video to watch on priority.

In one embodiment, the prioritized multimedia content 110A-C may be delivered to the user 118 on his/her personal communication device (shown in FIG. 5) having access to the Internet. In one embodiment, the personal communication device may include a smart phone, notebook, tablet, personal computer, personal digital assistant, connected television and any such device capable of having access to the Internet.

Figure 3A:
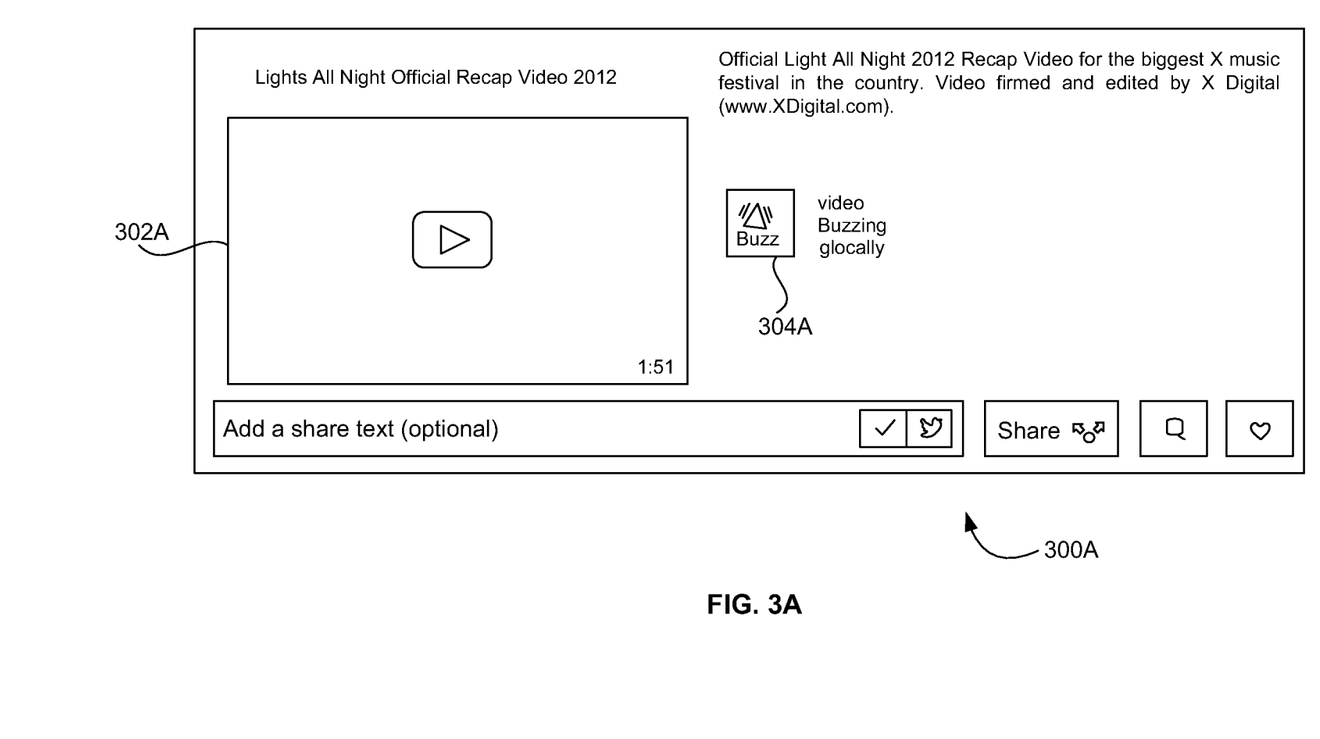
FIG. 3A through 3E illustrates an user interface view of a recommended multimedia content based on one or more general parameters according to an embodiment herein.
Figure 3B:
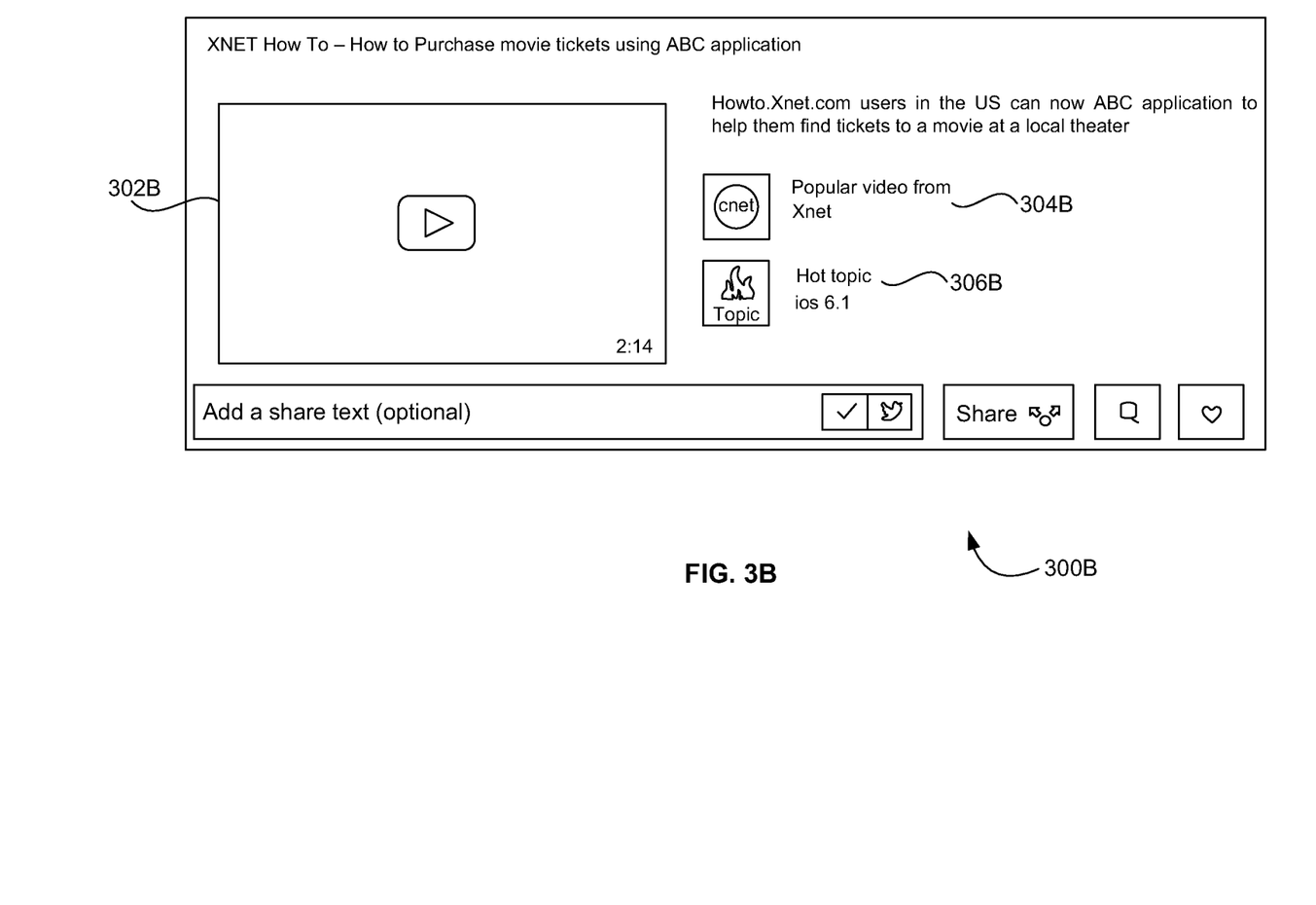
Figure 3C:
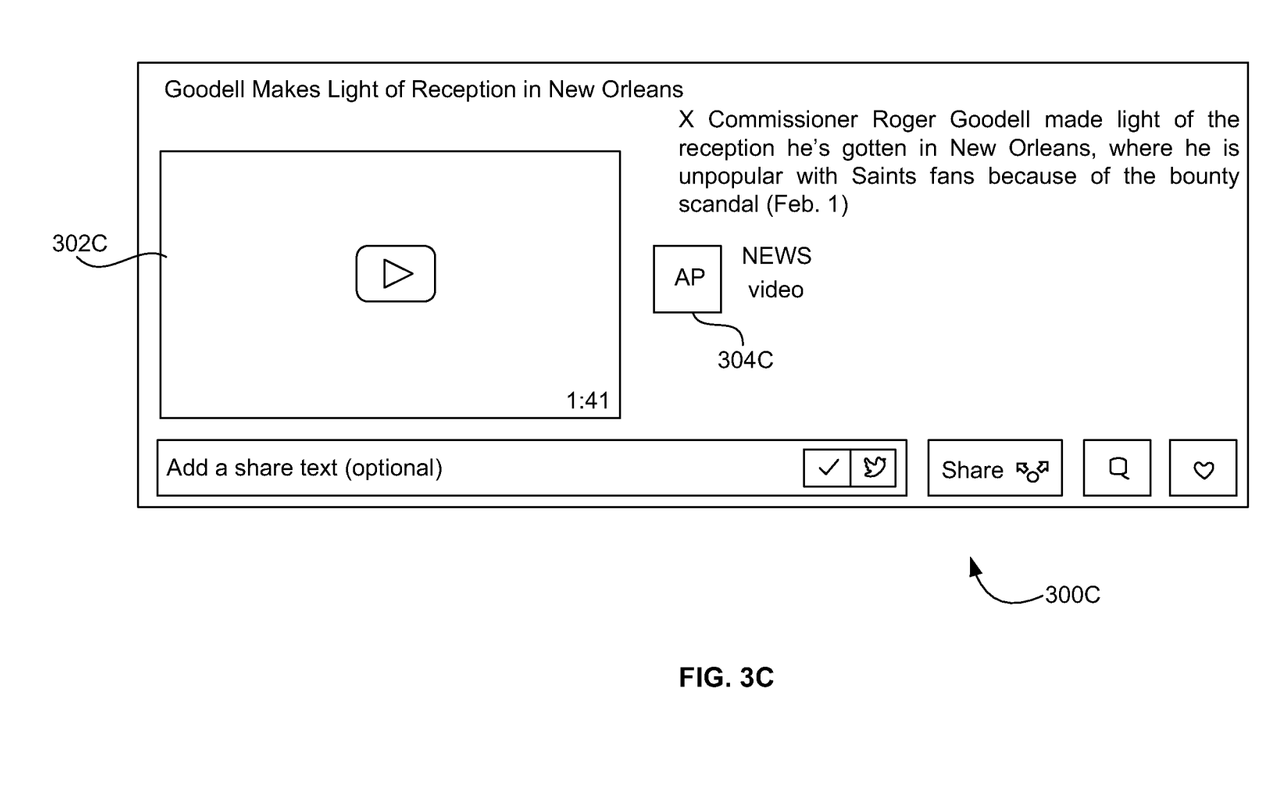
Figure 3D:
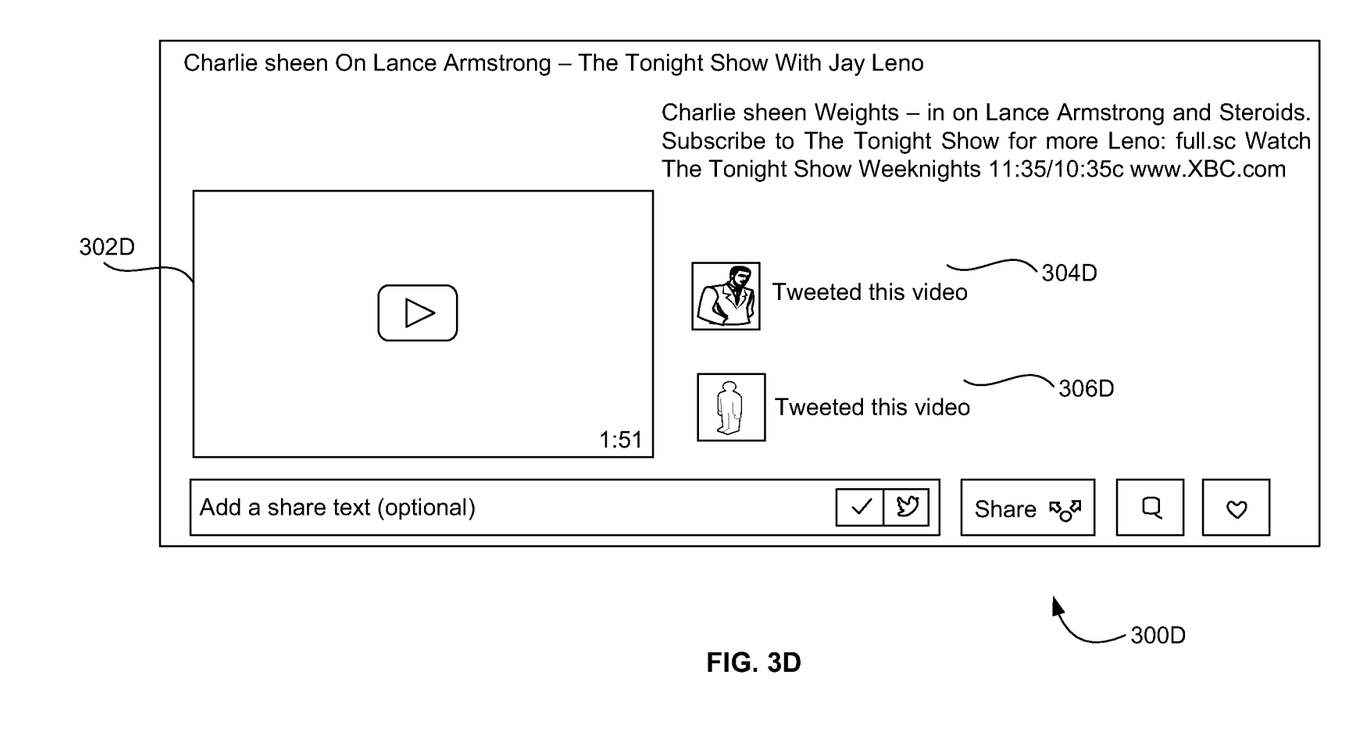
Figure 3E:
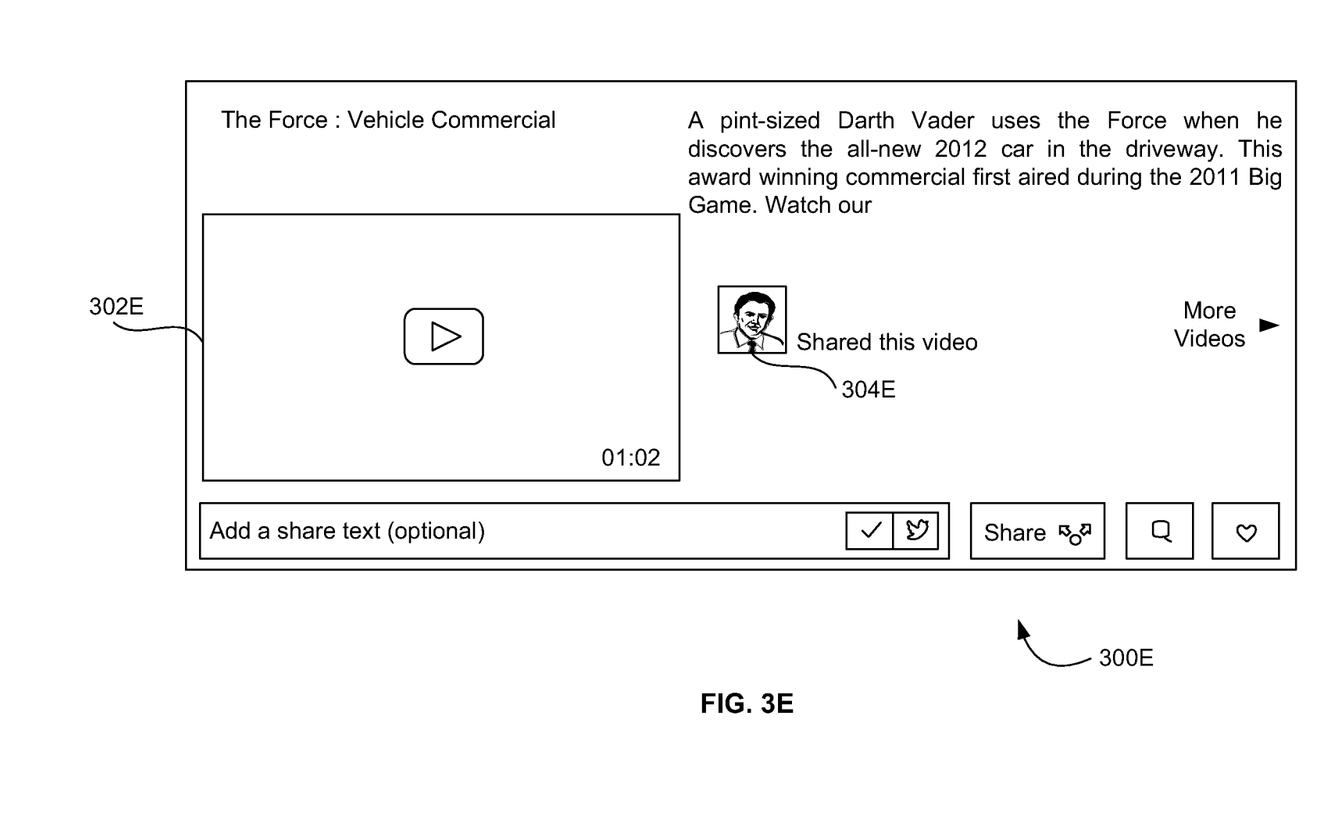

FIG. 3A through 3E illustrates a user interface view of the recommended multimedia content based on one or more general parameters according to an embodiment herein. In particular, FIG. 3A illustrates a user interface view 300A of the recommended multimedia content 302A based on the first set of parameters 104A according to an embodiment herein. In one embodiment, the recommended multimedia content 302A which include a reason "a buzzing videos" field 304A. FIG. 3B illustrates a user interface view 300B of the recommended multimedia content 302B based on the first set of parameters 104A according to an embodiment herein. In one embodiment, the recommended multimedia content 302B which include a reason "a popular videos" field 304B and "hot topic" field 306B. FIG. 3C illustrates a user interface view 300C of the recommended multimedia content 302C based on the first set of parameters 104A according to an embodiment herein. In one embodiment, the recommended multimedia content 302C which include reason "breaking news" field 304C. FIG. 3D illustrates a user interface view 300D of the recommended multimedia content 302D based on the second set of parameters 104B according to an embodiment herein. In one embodiment, the recommended multimedia content 302D which include a reason "a celebrity sharing" field 304D and "a celebrity sharing" field 306D. FIG. 3E illustrates a user interface view 300E of the recommended multimedia content 302E based on the second set of parameters 104B according to an embodiment herein. In one embodiment, the recommended multimedia content 302E which include a reason "a friends sharing" field 304E.

Figure 4:
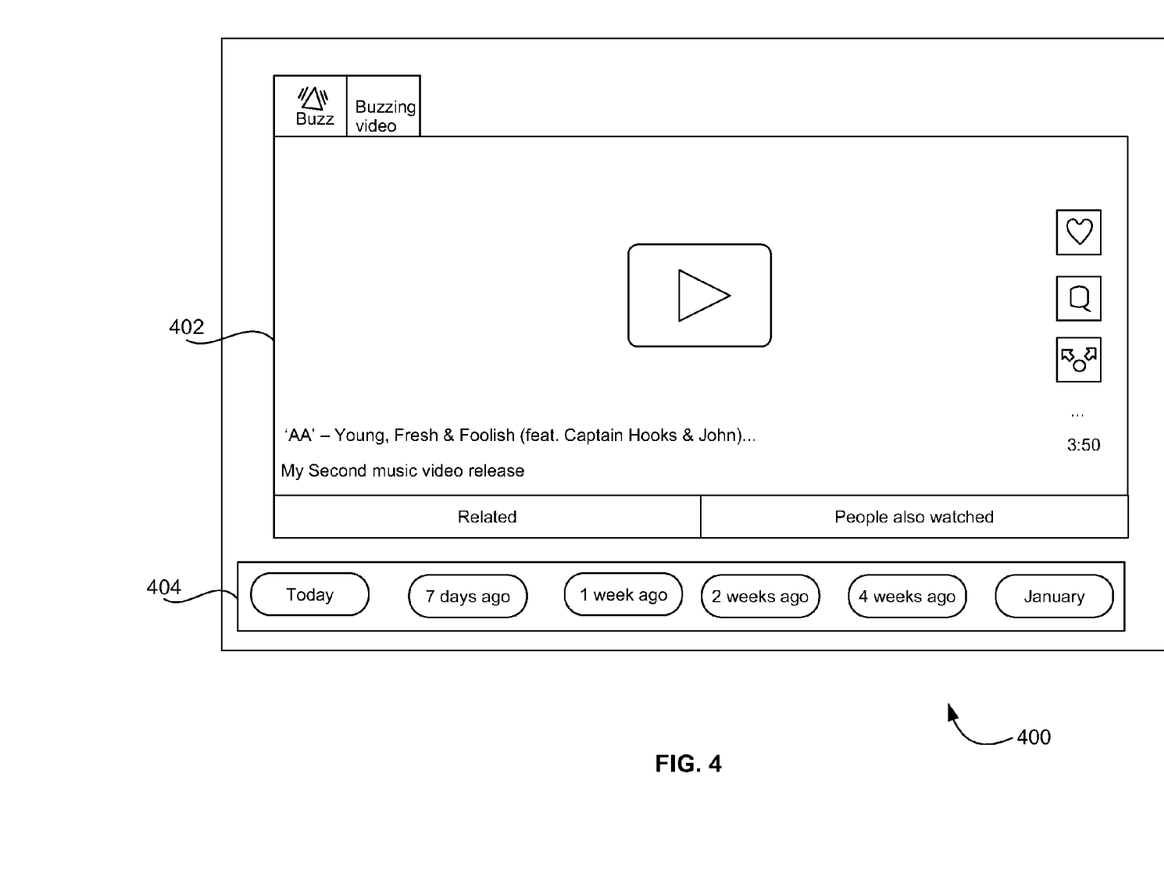
FIG. 4 illustrates an user interface view of the recommended multimedia content targeted to the user periodically according to an embodiment herein.

FIG. 4 illustrates a user interface view 400 of a recommended multimedia content 402 targeted to the user 118 periodically according to an embodiment herein. The user interface view 400 includes a duration field 404 with one or more options (e.g., today, one week ago, two week ago, four week ago, January etc.). On selecting an option from the one or more options, one or more multimedia content may be delivered to the user 118. For example, when the user 118 selects the option one week ago, one or more multimedia content associated with the week may be delivered.

Figure 5:
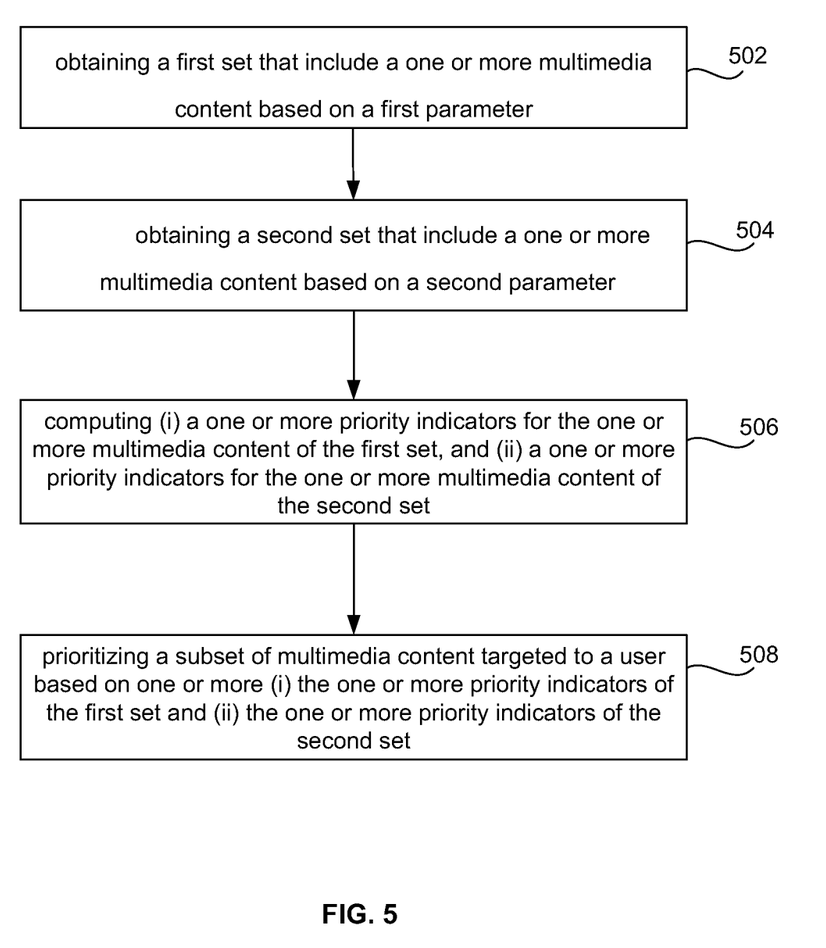
FIG. 5 is a flow diagram illustrating a method of recommending and prioritizing multimedia content targeted to the user according to an embodiment herein.

FIG. 5 is a flow diagram illustrating a method of recommending and prioritizing multimedia content targeted to the user according to an embodiment herein. In step 502, a first set that includes a one or more multimedia content is obtained based on the first set of parameters 104A. In one embodiment, the first set of parameters 104A may be (i) a trending topics, (ii) a breaking news, (iii) a trending multimedia content, (iv) a celebrity, and (v) a popular channel. In step 504, a second set that includes a one or more multimedia content is obtained based on the second set of parameters 104B. In one embodiment, the second set of parameters 104B may be (i) activities of one or more user connected to the user on one or more social medium (ii) a social channel of a celebrity, (iii) a preferred celebrity of the user, and (iv) a subscribed channel. In step 506, (i) one or more priority indicators (e.g., a first set of priority indicators) is computed for the one or more multimedia content of the first set based on one or more (i) relative degree associated with a multimedia content, (ii) recency of activity associated with a multimedia content, (iii) trending of a multimedia content, and (iv) a popularity of at least one of (a) a multimedia content, (b) a celebrity, (c) a channel, or (d) a topic, and (ii) one or more priority indicators (e.g., a second set of priority indicators) are computed for the one or more multimedia content of the second set based on (i) profile of a user, (ii) taste of the user, (iii) affinities of the user, (iv) preferences of the user, and (v) past activities of the user. The user profile may include an age group, a gender, a qualification, hobbies and a location of the user. In step 508, a subset of multimedia content targeted to a user is prioritized based on one or more (i) the one or more priority indicators of the first set and (ii) the one or more priority indicators of the second set. The duplicate multimedia content may be filtered from (a) the first set, (b) the second set, and (c) a combination of the first set and the second set based on a metadata associated with each multimedia content of the first set and the second set. The metadata may be generated by an authentic source. The undesirable multimedia content may be filtered from (a) the first set and (b) the second set. The undesirable multimedia content may be flagged as (i) a dead link, (ii) unreliable or objectionable, or (iii) an explicit multimedia content.

Figure 6:
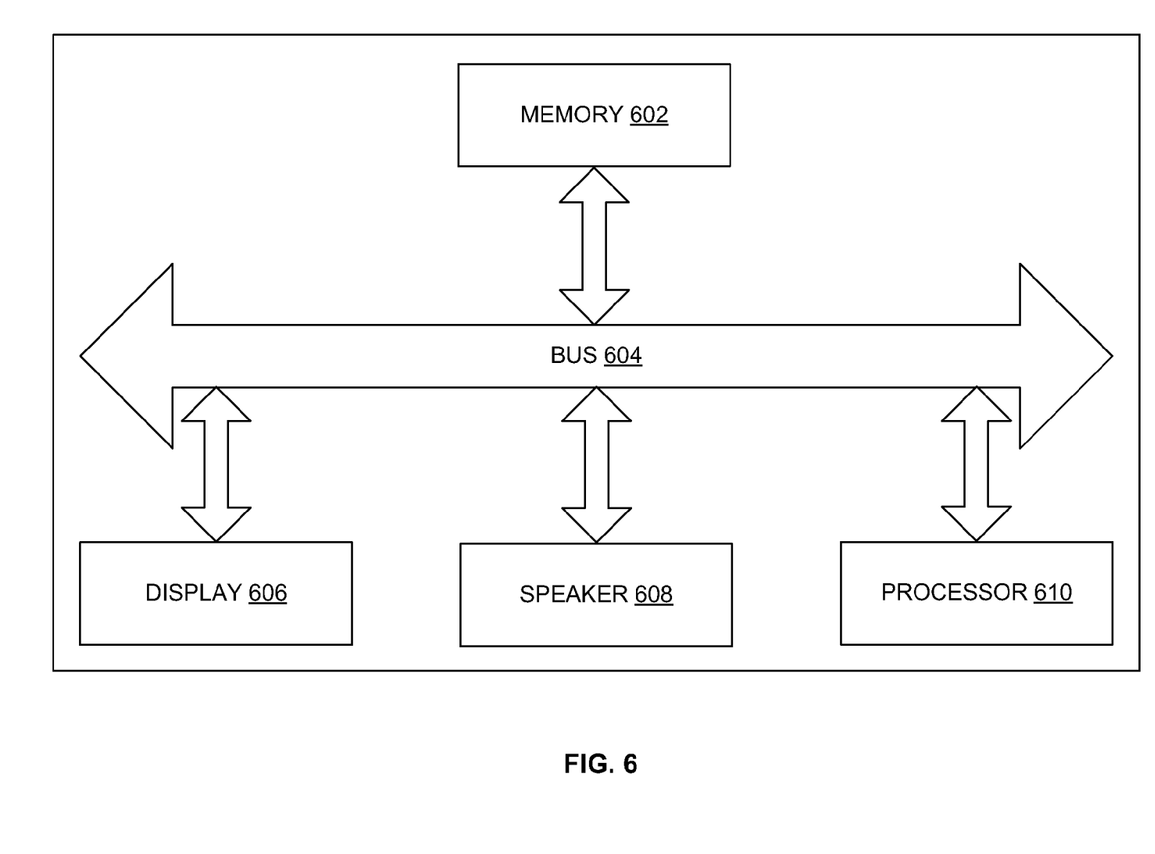
FIG. 6 illustrates an exploded view of a personal communication device according to the embodiments herein.

FIG. 6 illustrates an exploded view of the personal communication device having an a memory 602 having a set of computer instructions, a bus 604, a display 606, a speaker 608, and a processor 610 capable of processing a set of instructions to perform any one or more of the methodologies herein, according to an embodiment herein. In one embodiment, the receiver may be the personal communication device. The processor 610 may also enable digital content to be consumed in the form of video for output via one or more displays 606 or audio for output via speaker and/or earphones 608. The processor 610 may also carry out the methods described herein and in accordance with the embodiments herein.

Digital content may also be stored in the memory 602 for future processing or consumption. The memory 602 may also store program specific information and/or service information (PSI/SI), including information about digital content (e.g., the detected information bits) available in the future or stored from the past. A user of the personal communication device may view this stored information on display 606 and select an item of for viewing, listening, or other uses via input, which may take the form of keypad, scroll, or other input device(s) or combinations thereof. When digital content is selected, the processor 610 may pass information. The content and PSI/SI may be passed among functions within the personal communication device using the bus 604.

The techniques provided by the embodiments herein may be implemented on an integrated circuit chip (not shown). The chip design is created in a graphical computer programming language, and stored in a computer storage medium (such as a disk, tape, physical hard drive, or virtual hard drive such as in a storage access network). If the designer does not fabricate chips or the photolithographic masks used to fabricate chips, the designer transmits the resulting design by physical means (e.g., by providing a copy of the storage medium storing the design) or electronically (e.g., through the Internet) to such entities, directly or indirectly.

The stored design is then converted into the appropriate format (e.g., GDSII) for the fabrication of photolithographic masks, which typically include multiple copies of the chip design in question that are to be formed on a wafer. The photolithographic masks are utilized to define areas of the wafer (and/or the layers thereon) to be etched or otherwise processed.

The resulting integrated circuit chips can be distributed by the fabricator in raw wafer form (that is, as a single wafer that has multiple unpackaged chips), as a bare die, or in a packaged form. In the latter case the chip is mounted in a single chip package (such as a plastic carrier, with leads that are affixed to a motherboard or other higher level carrier) or in a multichip package (such as a ceramic carrier that has either or both surface interconnections or buried interconnections). In any case the chip is then integrated with other chips, discrete circuit elements, and/or other signal processing devices as part of either (a) an intermediate product, such as a motherboard, or (b) an end product. The end product can be any product that includes integrated circuit chips, ranging from toys and other low-end applications to advanced computer products having a display, a keyboard or other input device, and a central processor.

The embodiments herein can take the form of, an entirely hardware embodiment, an entirely software embodiment or an embodiment including both hardware and software elements. The embodiments that are implemented in software include but are not limited to, firmware, resident software, microcode, etc. Furthermore, the embodiments herein can take the form of a computer program product accessible from a computer-usable or computer-readable medium providing program code for use by or in connection with a computer or any instruction execution system. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, remote controls, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 7:
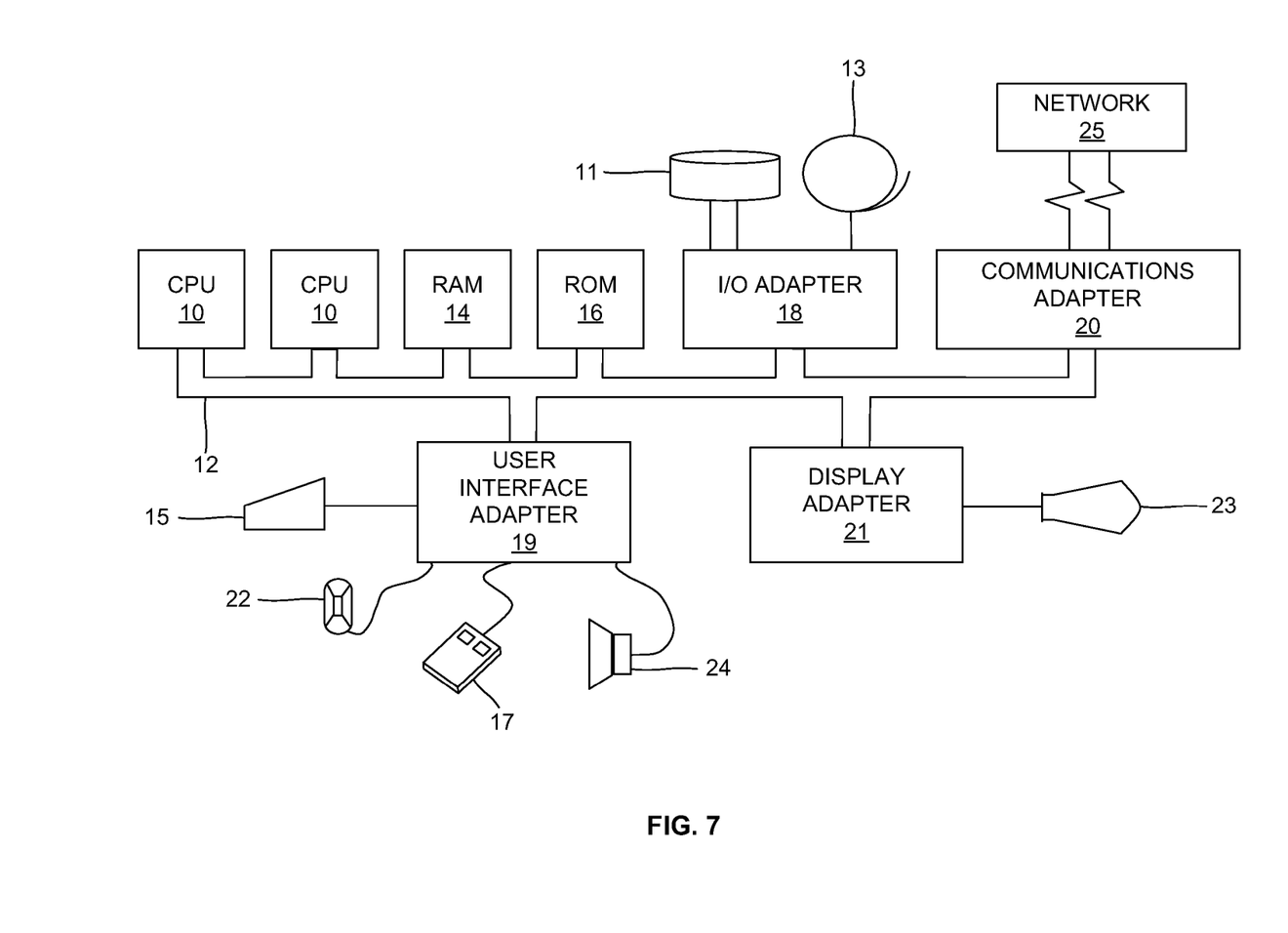
FIG. 7 a schematic diagram of a computer architecture used in accordance with the embodiment herein.

A representative hardware environment for practicing the embodiments herein is depicted in FIG. 7. This schematic drawing illustrates a hardware configuration of an information handling/computer system in accordance with the embodiments herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the embodiments herein.

The system further includes a user interface adapter 19 that connects a keyboard 15, mouse 17, speaker 24, microphone 22, and/or other user interface devices such as a touch screen device (not shown) or a remote control to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

The content recommendation system 102 the filtering of the first set of multimedia content and the second set of multimedia content based on first set of parameters 104A and the second set of parameters 104B provides a level of human curation that enables downsizing of the humongous volume of the multimedia content that is accumulated in the web with each passing minute. Further the filtering step leads to significant improvement in the quality of the prioritized multimedia content 110A-C targeted to the user 118 and decouples the subsequent steps from poor quality of metadata that surrounds the content. Further the increased relevance of the promotional content ensures that the quality of video filtration as perceived by the user 118 is not adversely affected in any manner.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method of recommending and prioritizing multimedia content targeted to a user, said method comprising:
    obtaining a first set that comprises a first plurality of multimedia content based on a first set of parameters;
    obtaining a second set that comprises a second plurality of multimedia content based on a second set of parameters, and wherein each parameter is assigned with a weightage;
    computing:
    (i) a plurality of first priority indicators for said first plurality of multimedia content of said first set, wherein computing a plurality of first priority indicators for said first plurality of multimedia content of said first set involves assigning a weight, and (ii) a plurality of second priority indicators for said second plurality of multimedia content of said second set, and wherein computing a plurality of second priority indicators for said second plurality of multimedia content of said first set involves assigning a weight;
    prioritizing a subset of multimedia content targeted to said user based on at least one of (i) said plurality of first priority indicators and (ii) said plurality of second priority indicators, wherein the step of prioritizing includes the step of tagging prioritized multimedia content with a reason for prioritizing said multimedia content;
    generating a prioritized multimedia content targeted to said user, and wherein a technical content is shown to an engineer, and wherein a content relevant to home decoration, housekeeping and beauty care are shown to woman, and wherein a content requesting parental guidance is shown children belonging to certain age group;
    discarding a duplicate multimedia content from (a) said first set, (b) said second set, and (c) a combination of said first set and said second set based on a metadata associated with each multimedia content of said first set and said second set wherein said metadata is generated by an authentic source;
    delivering said subset of multimedia content along with a reason for prioritizing to said user wherein said reason is obtained from at least one of (i) said first set of parameters and (ii) said second set of parameters and wherein each parameter is assigned with a weightage, and wherein each prioritized multimedia content is selected based on a ranking:
    delivering a promotional content in addition to the prioritized multimedia content, and wherein the promotional content includes a sponsored and/or other commercial content, and wherein a relevance of the promotional content presented to the user is enhanced by selecting the promotional content based on one or more general parameters; and identifying undesirable media content amongst said first set of multimedia content and said second set of multimedia content, based at least on metadata associated with the multimedia content, and classifying identified undesirable content as at least one of a deadlink, objectionable content unreliable content and explicit multimedia content, based on said metadata.

2. The method of claim 1, wherein said first set of parameters comprises at least one of (i) a trending topics, (ii) a breaking news, (iii) a trending multimedia content, (iv) a celebrity, and (v) a popular channels.

3. The method of claim 1, wherein said first set of parameters comprises at least one of (i) activities of at least one user connected to said user on at least one social medium (ii) a social channel of a celebrity, (iii) a preferred celebrity of said user, and (iv) a subscribed channel.

4. The method of claim 1, wherein said plurality of first priority indicators is computed based on at least one of (i) relative degree associated with a multimedia content, (ii) frequency of activity associated with a multimedia content, (iii) trending of a multimedia content, and (iv) a popularity of at least one of (a) a multimedia content, (b) a celebrity, (c) a channel, or (d) a topic.

5. The method of claim 1, wherein said plurality of second priority indicators is computed based on at least one of (i) profile of said user, (ii) taste of said user, (iii) affinities of said user, (iv) preferences of said user, and (v) past activities of said user, wherein said profile comprises an age group, a gender, a qualification, hobbies and a location of said user.

6. A content recommendation system comprising:
(i) a memory unit comprising a database that stores at least one of (a) profile of a user (b) taste of said user, (c) affinities of said user, (d) preferences of said user and (e) past activities of said user, wherein said profile comprises an age group, a gender, a qualification, hobbies and a location of said user; and
(ii) a processor that executes a set of modules comprising:
(a) a priority computing module executed by said processor that is configured to:
(i) compute a plurality of first priority indicators for a first set, wherein said first set comprises a first plurality of multimedia content that is obtained based on a first set of parameters; and
(ii) compute a plurality of second priority indicators for a second set, wherein said second set comprises a second plurality of multimedia content that is obtained based on a second set of parameters; and (b) a multimedia content personalization module executed by said processor that is configured to prioritize a subset multimedia content targeted to said user based on (i) said plurality of first priority indicators (ii) and said plurality of second priority indicators, said multimedia content personalization module further configured to tag prioritized multimedia content with a reason for prioritizing said multimedia content, wherein said plurality of first priority indicators is computed based on at least one of (i) relative degree associated with a multimedia content nil frequency of activity associated with a multimedia content (iii) trending of a multimedia content, and (iv) a popularity of at least one of (a) a multimedia content (b) a celebrity, (c) a channel or (d) a topic, and wherein said plurality of second priority indicators is computed based on at least one of (i) profile of said user, (ii) taste of said user, (iii) affinities of said user, (iii) preferences of said user, and (v) past activities of said user, wherein said profile comprises an age group, a gender, a qualification, hobbies and a location of said user, and wherein the multimedia content personalization module is configured to generate a prioritized multimedia content targeted to said user, and wherein a technical content is shown to an engineer, and wherein a content relevant to home decoration, housekeeping and beauty care are shown to woman, and wherein a content requesting parental guidance is shown children belonging to certain age group;

(c) a filtering module executed by said processor and configured to: identify an undesirable multimedia content from said first set and said second set based at least on metadata associated with the multimedia content, wherein said undesirable multimedia content is being flagged as (i) a dead link, in unreliable or objectionable, or (iii) an explicit multimedia content, based on corresponding metadata; and filter duplicate multimedia content from said first set, said second set, and a combination of said first set and said second set based on a the metadata associated with each multimedia content of said first set and said second set, wherein said metadata is generated by an authentic source wherein a promotional content is delivered in addition to the prioritized multimedia content, and wherein the promotional content includes a sponsored and/or other commercial content, and wherein a relevance of the promotional content presented to the user is enhanced by selecting the promotional content based on one or more general parameters.

* * * * *